United States Patent
Dew et al.

(10) Patent No.: US 6,733,567 B1
(45) Date of Patent: May 11, 2004

(54) RECOVERY OF NICKEL FROM NICKEL BEARING SULPHIDE MINERALS BY BIOLEACHING

(75) Inventors: David William Dew, Randburg (ZA); Petrus Basson, Randburg (ZA); Alan Norton, Johannesburg (ZA); Frank Crundwell, Randburg (ZA)

(73) Assignee: Billiton Intellectual Property, B.V., The Hague (NL)

( * ) Notice: Subject to any disclaimer, the term of this patent is extended or adjusted under 35 U.S.C. 154(b) by 96 days.

(21) Appl. No.: 10/069,947

(22) PCT Filed: Sep. 5, 2000

(86) PCT No.: PCT/ZA00/00162

§ 371 (c)(1),
(2), (4) Date: Jul. 19, 2002

(87) PCT Pub. No.: WO01/18268

PCT Pub. Date: Mar. 15, 2001

(30) Foreign Application Priority Data

Sep. 7, 1999 (ZA) ............................................. 99/5746

(51) Int. Cl.⁷ ................................................ C21B 3/18
(52) U.S. Cl. ..................... 75/743; 75/712; 423/DIG. 17
(58) Field of Search ............. 75/743, 712; 423/DIG. 17

(56) References Cited

U.S. PATENT DOCUMENTS

| 5,007,620 A | 4/1991 | Emmett, Jr. et al. |
| 5,021,069 A | * 6/1991 | Whellock et al. ............. 446/22 |

FOREIGN PATENT DOCUMENTS

| EP | 0 808 910 A2 | 11/1997 |
| GB | 2 225 256 A | 5/1990 |
| GB | 2 291 870 A | 2/1996 |
| WO | WO 98/26100 | 6/1998 |
| WO | WO 99/09226 | 2/1999 |
| WO | WO 00/29629 | 5/2000 |

* cited by examiner

Primary Examiner—Melvin Andrews
(74) Attorney, Agent, or Firm—Jones, Tullar & Cooper, PC

(57) ABSTRACT

A method of recovering nickel from a nickel bearing sulphide mineral slurry which includes the steps of subjecting the slurry to a bioleaching process, supplying a feed gas which contains in excess of 21% oxygen by volume, to the slurry, and recovering nickel from a bioleach residue of the bioleaching process.

26 Claims, 5 Drawing Sheets

Figure 2 Results Showing The Effect of Reduced Microbial Oxidation On Iron(II) Concentration Levels In Solution As A Result Of Operating At Low Dissolved Oxygen Concentrations Figure 3 Results Showing The Increase In Specific Oxygen Demand and Oxygen Utilisation Achieved By Increasing The Oxygen Content Of The Inlet Gas Under Controlled Conditions By The Method Of The Invention Figure 4 Results Demonstrating The Enhancement Of The Oxygen Mass Transfer Coefficient

RECOVERY OF NICKEL FROM NICKEL BEARING SULPHIDE MINERALS BY BIOLEACHING

BACKGROUND OF THE INVENTION

This invention relates to the recovery of nickel from nickel bearing sulphide minerals.

Commercial bioleach plants which are currently in operation treating sulphide minerals, typically operate within the temperature range of 40° C. to 50° C. and rely on sparging air to the bioleach reactors to provide the required oxygen. Operation at this relatively low temperature and the use of air to supply oxygen, limit the rate of sulphide mineral oxidation that can be achieved.

The use of high temperatures between 50° C. and 100° C. greatly increases the rate of sulphide mineral leaching.

The solubility of oxygen is however limited at high temperatures and the rate of sulphide mineral leaching becomes limited. In the case of using air for the supply of oxygen, the effect of limited oxygen solubility is such that the rate of sulphide mineral leaching becomes dependent on and is limited by the rate of oxygen transfer from the gas to the liquid phase.

The bioleaching of nickel sulphide bearing minerals is similarly problematic and to the applicant's knowledge no commercial nickel bioleaching plants are in operation.

SUMMARY OF THE INVENTION

According to one aspect of the invention there is provided a method of recovering nickel from a nickel bearing sulphide mineral slurry which includes the steps of:

(a) subjecting the slurry to a bioleaching process, (b) supplying a feed gas which contains in excess of 21% oxygen by volume, to the slurry, and (c) recovering nickel from a bioleach residue of the bioleaching process.

If the slurry contains copper then preferably copper is removed from the bioleach residue before recovering nickel therefrom.

The method may include the step of recovering cobalt from the bioleach residue before recovering nickel therefrom.

Iron may also be removed from the bioleach residue before recovering nickel therefrom. The iron may be precipitated from the bioleach residue by the addition of limestone to the residue, or in any other suitable way. Carbon dioxide generated in the iron precipitation step may be fed to the feed gas of step (b) or directly to the slurry.

In step (c) nickel may be recovered using any appropriate technique. Use may for example be made of a solvent extraction and electrowinning process. In this instance oxygen generated during the nickel electrowinning step may be fed to the feed gas of step (b) or directly to the slurry.

It is also possible to recover nickel, in step (c), using a pressure hydrogen reduction process. In this case nitrogen, produced during the generation of the feed gas which is supplied to the slurry in step (b), may be used for purging autoclaves used for nickel powder production in the pressure hydrogen reduction process.

The introduction of pressure acid leaching (PAL) for the recovery of nickel from lateritic ores opens up additional opportunities for bioleaching of nickel bearing sulphides. The volumes arising down stream of PAL processes are roughly an order of magnitude higher than the mass of nickel sulphide concentrates arising from sulphide nickel mines (approximately 1–3 million tonnes per annum versus approximately 20–200 thousand tonnes per annum).

Since residues from both processes are similar in nature (low pH, solubilised nickel and iron) it is advantageous to treat the bioleach residue for nickel and cobalt recovery using the larger PAL downstream process equipment Thus feeding a nickel sulphide bioleach residue slurry into a PAL residue slurry and treating both streams together thereafter would bring about considerable economies of scale in terms of capital and operating costs.

Thus the invention also extends to operating the aforementioned method in parallel to a process for recovering nickel from lateritic ores by pressure acid leaching to produce a nickel laterite residue slurry and then adding the bioleach residue to the nickel laterite ore slurry before carrying out step (c).

As used herein the expression "oxygen enriched gas" is intended to include a gas, e.g. air, which contains in excess of 21% oxygen by volume. This is an oxygen content greater than the oxygen content of air. The expression "pure oxygen" is intended to include a gas which contains in excess of 85% oxygen by volume.

Preferably the feed gas which is supplied to the slurry contains in excess of 85% oxygen by volume i.e. is substantially pure oxygen.

The method may include the step of maintaining the dissolved oxygen concentration in the slurry within a desired range which may be determined by the operating conditions and the type of microorganisms used for leaching. The applicant has established that a lower limit for the dissolved oxygen concentration to sustain microorganism growth and mineral oxidation, is in the range of from $0.2 \times 10^{-3}$ kg/m$^3$ to $4.0 \times 10^{-3}$ kg/m$^3$. On the other hand if the dissolved oxygen concentration is too high then microorganism growth is inhibited. The upper threshold concentration also depends on the genus and strain of microorganism used in the leaching process and typically is in the range of from $4 \times 10^{-3}$ kg/m$^3$ to $10 \times 10^{-3}$ kg/m$^3$.

Thus, preferably, the dissolved oxygen concentration in the slurry is maintained in the range of from $0.2 \times 10^{-3}$ kg/m$^3$ to $10 \times 10^{-3}$ kg/m$^3$.

The method may include the steps of determining the dissolved oxygen concentration in the slurry and, in response thereto, of controlling at least one of the following: the oxygen content of the feed gas, the rate of supply of the feed gas to the slurry, and the rate of feed of slurry to a reactor.

The dissolved oxygen concentration in the slurry may be determined in any appropriate way, e.g. by one or more of the following: by direct measurement of the dissolved oxygen concentration in the slurry, by measurement of the oxygen content in gas above the slurry, and indirectly by measurement of the oxygen content in off-gas from the slurry, taking into account the rate of oxygen supply, whether in gas enriched or pure form, to the slurry, and other relevant factors.

The method may include the step of controlling the carbon content of the slurry. This may be achieved by one or more of the following: the addition of carbon dioxide gas to the slurry, and the addition of other carbonaceous material to the slurry.

The method may extend to the step of controlling the carbon dioxide content of the feed gas to the slurry in the range of from 0.5% to 5% by volume. A suitable figure is of the order of 1% to 1.5% by volume. The level of the carbon dioxide is chosen to maintain high rates of microorganism growth and sulphide mineral oxidation.

The bioleaching process is preferably carried out at an elevated temperature. As stated hereinbefore the bioleaching rate increases with an increase in operating temperature. Clearly the microorganisms which are used for bioleaching are determined by the operating temperature and vice versa. As the addition of oxygen enriched gas or substantially pure oxygen to the slurry has a cost factor it is desirable to operate at a temperature which increases the leaching rate by an amount which more than compensates for the increase in operating cost. Thus, preferably, the bioleaching is carried out at a temperature in excess of 40° C.

The bioleaching may be carried out at a temperature of up to 100° C. or more and preferably is carried out at a temperature which lies in a range of from 60° C. to 85° C.

In one form of the invention the method includes the step of bioleaching the slurry at a temperature of up to 45° C. using mesophile microorganisms. These microorganisms may, for example, be selected from the following genus groups:

Acidithiobacillus (formerly Thiobacillus); Leptosprillum; Ferromicrobium; and Acidiphilium.

In order to operate at this temperature the said microorganisms may, for example, be selected from the following species:

Acidithiobacillus caldus (Thiobacillus caldus); Acidithiobacillus thiooxidans (Thiobacillus thiooxidans), Acidithiobacillus ferrooxidans (Thiobacillus ferrooxidans); Acidithiobacillus acidophilus (Thiobacillus acidophilus); Thiobacillus prosperus; Leptospirillium ferrooxidans; Ferromicrobium acidophilus; and Acidiphilium cryptum.

If the bioleaching step is carried out at a temperature of from 45° C. to 60° C. then moderate thermophile microorganisms may be used. These may, for example, be selected from the following genus groups:

Acidithiobacillus (formerly Thiobacillus); Acidimicrobium; Sulfobacillus; Ferroplasma (Ferriplasma); and Alicyclobacillus.

Suitable moderate thermophile microorganisms may, for example, be selected from the following species:

Acidithiobacillus caldus (formerly Thiobacillus caldus); Acidimicrobium ferrooxidans; Sulfobacillus acidophilus; Sulfobacillus disulfidooxidans; Sulfobacillus thermosulfidooxidans; Ferroplasma acidarmanus; Thermoplasma acidophilum; and Alicyclobacillus acidocaldrius.

It is preferred to operate the leaching process at a temperature in the range of from 60° C. to 85° C. using thermophilic microorganisms. These may, for example, be selected from the following genus groups: Acidothermus; Sulfolobus; Metallosphaera; Acidianus; Ferroplasma (Ferriplasma); Thermoplasma; and Picrophilus.

Suitable thermophilic microorganisms may, for example, be selected from the following species: Sulfolobus metallicus; Sulfolobus acidocaldarius; Sulfolobus thermosulfidooxidans; Acidianus infernus; Metallosphaera sedula; Ferroplasma acidarmanus; Thermoplasma acidophilum; Thermoplasma volcanium; and Picrophilus oshimae.

The slurry may be leached in a reactor tank or vessel which is open to atmosphere or substantially closed. In the latter case vents for off-gas may be provided from the reactor.

According to a different aspect of the invention there is provided a method of recovering nickel from a slurry containing nickel bearing sulphide minerals which includes the steps of bioleaching the slurry using a suitable microorganism at a temperature in excess of 40° C., controlling the dissolved oxygen concentration in the slurry within a predetermined range, and recovering nickel from a bioleach residue.

The said dissolved oxygen concentration may be controlled by controlling the supply of oxygen to the slurry.

The oxygen may be supplied to the slurry in the form of oxygen enriched gas or substantially pure oxygen.

The said operating temperature is preferably above 60° C. and may be in the range of 60° C. to 85° C.

The invention also extends to a method of enhancing the oxygen mass transfer coefficient from a gas phase to a liquid phase in a nickel bearing sulphide mineral slurry which includes the step of supplying a feed gas containing in excess of 21% oxygen by volume to the slurry.

The feed gas preferably contains in excess of 85% oxygen by volume.

The invention further extends to a method of bioleaching an aqueous slurry containing nickel bearing sulphide minerals which includes the steps of bioleaching the slurry at a temperature above 60° C. and supplying gas containing in excess of 21% oxygen by volume to the slurry to maintain the dissolved oxygen concentration in the slurry in the range of from $0.2 \times 10^{-3}$ kg/m$^3$ to $10 \times 10^{-3}$ kg/m$^3$.

The invention is also intended to cover a plant for recovering nickel from a nickel bearing sulphide mineral slurry which includes a reactor vessel, a source which feeds a nickel bearing sulphide mineral slurry to the vessel, an oxygen source, a device which measures the dissolved oxygen concentration in the slurry in the vessel, a control mechanism whereby, in response to the said measure of dissolved oxygen concentration, the supply of oxygen from the oxygen source to the slurry is controlled to achieve a dissolved oxygen concentration in the slurry within a predetermined range, and a recovery system which recovers nickel from a bioleach residue from the reactor vessel.

The plant may include an installation for recovering nickel from lateritic ores by pressure acid leaching to produce a nickel laterite residue slurry which is combined with the said bioleach residue from the reactor, and the combined slurry and residue are fed to the said recovery system.

Various techniques may be used for controlling the supply of oxygen to the slurry and hence for controlling the dissolved oxygen concentration in the slurry at a desired value. Use may for example be made of valves which are operated manually. For more accurate control use may be made of an automatic control system. These techniques are known in the art and are not further described herein.

As has been indicated oxygen and carbon dioxide may be added to the slurry in accordance with predetermined criteria. Although the addition of these materials may be based on expected demand and measurement of other performance parameters, such as iron(II) concentration, it is preferred, however, to make use of suitable measurement probes to sample the actual values of the critical parameters.

For example use may be made of a dissolved oxygen probe to measure the dissolved oxygen concentration in the slurry directly. To achieve this the probe is immersed in the slurry. The dissolved oxygen concentration may be measured indirectly by using a probe in the reactor off-gas or by transmitting a sample of the off-gas, at regular intervals, to an oxygen gas analyser. Again it is pointed out that measuring techniques of this type are known in the art and accordingly any appropriate technique can be used.

A preferred approach to the control aspect is to utilise one or more probes to measure the dissolved oxygen concentration in the slurry, whether directly or indirectly. The probes produce one or more control signals which are used to control the operation of a suitable valve or valves, e.g. solenoid valves, automatically so that the supply of oxygen to an air stream which is being fed to the slurry is varied automatically in accordance with real time measurements of the dissolved oxygen concentration in the slurry.

Although it is preferred to control the addition of oxygen to a gas stream which is fed to the slurry a reverse approach may be adopted in that the oxygen supply rate to the reactor vessel may be maintained substantially constant and the rate of supply of the sulphide mineral slurry to the reactor vessel may be varied to achieve a desired dissolved oxygen concentration.

The invention is not limited to the actual control technique employed and is intended to extend to variations of the aforegoing approaches and to any equivalent process.

Nickel bearing sulphide flotation concentrates frequently contain violarite and pyrrhotite and the method of the invention is of particular benefit, because both pyrrhotite and violarite have a high leaching rate, even at typical mesophile operating temperatures, which is further increased at the higher temperatures used with moderate and extreme thermophiles. Thus the benefits of the invention, including a high specific reactor sulphide oxidation duty and reduced specific power requirement for oxidation, will be obtained during the bioleaching of nickel bearing sulphide concentrates, even at mesophile operating temperatures.

Nickel may be recovered from solution by any appropriate process, for example by solvent extraction applied to the solution or by resin-in-pulp applied to the slurry, followed by electrowinning. The route adopted by Anaconda Nickel for treatment of leach liquors arising from nickel laterites at Murrin Murrin is also relevant i.e. by precipitation of a sulphide (using hydrogen sulphide) and refining of the sulphide precipitate by re-leaching, purification and hydrogen reduction. The route adopted by Preston Resources on a similar solution to that produced at Murrin Murrin at the Cawse project is also applicable, by precipitating a hydroxide (with magnesia), re-leaching, purification using solvent extraction and then electrowinning. Lastly the same process used at Cawse but with the production of a nickel carbonate from the solvent extraction strip liquor, would be most suitable for the production of nickel rondelles by methods established by Queensland Nickel Limited.

If electrowinning is selected as the production method for nickel, the oxygen generated at the anode in the electrowinning process may be used to supplement that used in the bioleach process, reducing the capital and operating costs required for oxygen production.

BRIEF DESCRIPTION OF THE DRAWINGS

The invention is further described by way of example with reference to the accompanying drawings in which.

DESCRIPTION OF PREFERRED EMBODIMENT

General Principles

Figure 1:
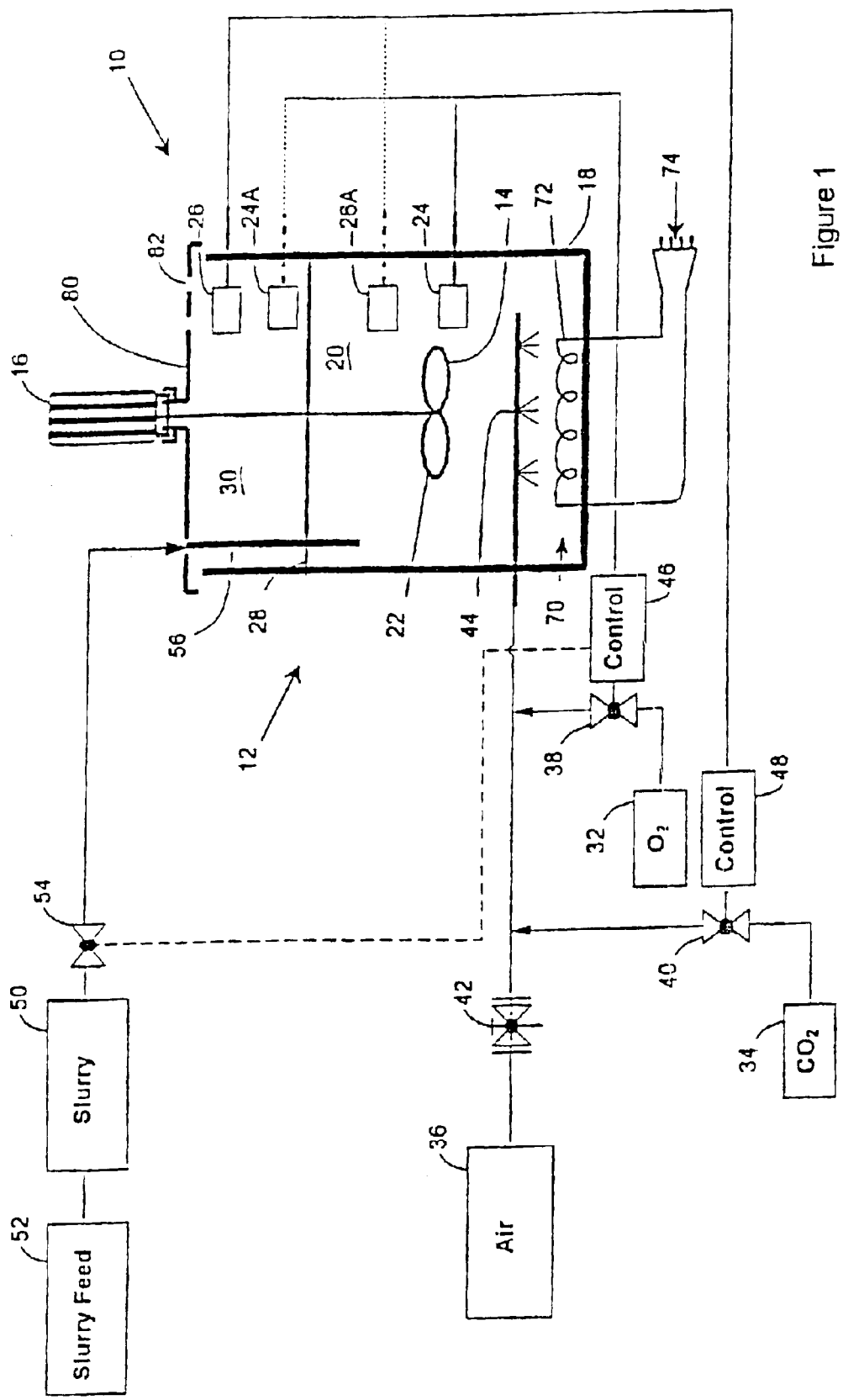
FIG. 1 is a schematic representation of a portion of a plant in which the invention is carried out, FIGS. 2, 3 and 4 reflect various results and parameters obtained from operating a bioreactor using the principles of the invention.

The limitation of low oxygen solubility during bioleaching, using air, at high temperatures, which in turn limits the rate of reaction, requires enrichment of the air with oxygen i.e. air with an oxygen content greater than 21% by volume, or the use of pure oxygen (defined as being greater than 85% oxygen by volume). The use of oxygen enriched air or pure oxygen overcomes the limited rate of reaction due to oxygen supply constraints, but has two major disadvantages:

a) the provision of oxygen enriched air or pure oxygen is expensive and requires a high utilisation (>60%) of the oxygen to warrant the additional expense; and b) if the oxygen level in solution becomes too high microorganism growth is prevented and sulphide mineral bioleaching stops.

Therefore, in order to realise the benefits of high rates of sulphide mineral leaching at high temperatures in commercial bioleaching plants, the drawbacks of requiring expensive oxygen and the risk of failure if the dissolved oxygen levels become too high must be overcome.

The bioleaching of sulphide minerals at an elevated temperature results in a high rate of sulphide mineral oxidation, but is dependent on the supply of oxygen and carbon dioxide to maintain high rates of sulphide mineral oxidation and of microorganism growth at adequate rates. The absorption of oxygen and carbon dioxide in the bioleaching reactor is limited, in each case, by the rate of mass transfer from the gas phase into the solution phase. For oxygen the rate of oxygen absorption is defined by equation (1) as follows:

$$i.\ R = M \cdot (C^* - C_L) \quad (1)$$

where: R=Oxygen demand as mass (kg) per unit volume ($m^3$) per unit time(s) ($kg/m^3/s$), ii. M=Oxygen mass transfer coefficient in reciprocal seconds ($s^{-1}$), iii. $C^*$=Saturated dissolved oxygen concentration as mass (kg) per unit volume ($m^3$) ($kg/m^3$), and iv. $C_L$=Dissolved oxygen concentration in solution as mass (kg) per unit volume ($m^3$) ($kg/m^3$).

The factor ($C^*-C_L$) is referred to as the oxygen driving force. A similar equation may be used to describe the rate of carbon dioxide supply to the solution. If the sulphide mineral oxidation rate is increased the oxygen demand increases proportionately. To meet a higher oxygen demand either the oxygen mass transfer coefficient (M) or the oxygen driving force ($C^*-C_L$) must be increased.

An increase in the oxygen mass transfer coefficient may be achieved by increasing the power input to the bioleach reactor mixer. This improves gas dispersion in the sulphide mineral slurry. With this approach, however, an increase in the oxygen mass transfer coefficient of, for example, 40% requires an increase in the power input to the mixer by a factor of as much as 200%, with a commensurate increase in operating costs.

The oxygen driving force may be increased by increasing the saturated dissolved oxygen concentration $C^*$ and reducing the dissolved oxygen concentration $C_L$.

Microorganism population growth is limited or prevented if the dissolved oxygen concentration $C^*$ reaches too high a level. A concentration level above $4 \times 10^{-3}$ $kg/m^3$ has been found to be detrimental to Sulfolobus-like strains. Certain Acidithiobacillus strains, however, have been found to be tolerant to dissolved oxygen concentrations of up to $10 \times 10^{-3}$ $kg/m^3$.

The applicant has established that a lower limit for the dissolved oxygen concentration to sustain microorganism growth and mineral oxidation is in the range of from $0.2 \times 10^{-3}$ kg/m$^3$ to $4.0 \times 10^{-3}$ kg/m$^3$. Thus, in order to provide an adequate, or optimum, supply of oxygen, the dissolved oxygen concentration in the sulphide mineral slurry must be monitored and, where appropriate, the addition of oxygen to the sulphide mineral slurry must be controlled in order to maintain the minimum dissolved oxygen concentration in solution at a value of from $0.2 \times 10^{-3}$ kg/m$^3$ to $4.0 \times 10^{-3}$ kg/m$^3$.

On the other hand the dissolved oxygen concentration must not exceed an upper threshold value at which microorganism growth is prevented. It is pointed out that the upper threshold concentration depends on the genus and strain of microorganism used in the bioleaching process. A typical upper threshold value is in the range of from $4 \times 10^{-3}$ kg/m$^3$ to $10 \times 10^{-3}$ kg/m$^3$.

As has been previously indicated the rate of sulphide mineral oxidation, which can be achieved when operating at a relatively low temperature of the order of from 40° C. to 55° C., is limited. In order to increase the rate of oxidation it is desirable to make use of thermophiles and to operate at temperatures in excess of 60° C. Any suitable microorganism capable of operating within this temperature range may be used. The optimum operating temperature is dependent on the genus and type of microorganism used. Thus moderate thermophiles of the type Sulfobacillus are suitable for operating at a temperature of up to 65° C. Thermophiles of the type Sulfolobus are suitable for operating at temperatures of from 60° C. to at least 85° C. *Sulfolobus metallicus*, for example, shows optimal growth in the temperature range of from 65° C. to 70° C.

The applicant has established that the operation of the bioleaching process, using a gas enriched with oxygen, or pure oxygen, as the oxidant, at elevated temperatures of from 40° C. to 85° C.:

increases the specific sulphide oxidation duty of the reactor considerably;

results in an unexpected and significantly enhanced oxygen mass transfer rate;

increases the oxygen utilisation, providing that the dissolved oxygen concentration is controlled above the point where microorganism growth and mineral oxidation are prevented and below the point at which microorganism growth is inhibited; and the overall power required for the oxidation of sulphide minerals is significantly reduced.

The method of the invention represents a significant improvement compared to a bioleach operation carried out at a temperature of from 40° C. to 45° C. with air.

The controlled addition of oxygen enriched air or pure oxygen directly into the bioreactor improves the oxygen utilisation efficiency. The oxygen utilisation for a conventional commercial bioleach plant (at least 100 m$^3$ in volume) operating at from 40° C. to 45° C. with air may be expected to achieve a maximum oxygen utilisation factor of from 40% to 50%. Consequently only 40% to 50% of the total mass of oxygen supplied to the bioleach plant is used to oxidise the sulphide minerals. With the method of the invention the oxygen utilisation is significantly higher, of the order of from 60% to 95%. The higher oxygen utilisation is achieved by controlled oxygen addition and results from the enhanced oxygen mass transfer rate and by operating at low dissolved oxygen concentrations in the solution phase.

It will be appreciated that although high oxygen demand in bioleach reactors has come about primarily by the use of higher temperatures, rapidly leaching sulphide minerals at temperatures below 60° C., using mesophile or moderate thermophile microorganisms, will have similarly high oxygen demands. The method of the invention is therefore not restricted to suit thermophiles or extreme thermophiles, but also mesophile and moderate thermophile microorganisms.

Another advantage of using air enriched with oxygen or pure oxygen is that the evaporation losses are reduced, because there is less inert gas removing water vapour from the top of the reactor. This is particularly important in areas where water is scarce or expensive.

In carrying out the method of the invention the temperature of the slurry in the bioleach vessel or reactor may be controlled in any suitable way known in the art in one example the bioleach reactor is insulated and heating takes place by means of energy which is released by the oxidation of sulphides. The temperature of the slurry is regulated using any suitable cooling system, for example an internal cooling system.

Table 1 shows typical data for specific sulphide oxidation duty and oxygen utilisation, when bioleaching with air at 40° C. to 45° C., in two commercial bioreactors, Plant A and Plant B respectively, (greater than 100 m$^3$ in volume).

TABLE 1

Commercial Bioreactor Performance Results

| Description | Units | Plant A | Plant B |
|---|---|---|---|
| Reactor temperature | ° C. | 42 | 40 |
| Reactor operating volume | m$^3$ | 471 | 896 |
| Oxygen utilisation | % | 37.9 | 43.6 |
| Typical dissolved oxygen concentration | mg/l | 2.5 | 2.7 |
| Oxygen mass transfer coefficient | s$^{-1}$ | 0.047 | 0.031 |
| Specific oxygen demand | kg/m$^3$/day | 21.6 | 14.8 |
| Specific sulphide oxidation duty | kg/m$^3$/day | 8.9 | 5.7 |
| Specific power consumption per kg sulphide oxidised | kWh/kgS$^{2-}$ | 1.7 | 1.8 |

At low temperatures (40° C.–50° C.), with air as the inlet gas, which applies to the results for the commercial reactors, Plant A and Plant B, presented in Table 1, the oxygen utilisations achieved are expected and the oxygen mass transfer coefficients (M) correspond to the applicant's design value. The applicant has determined that if the method of the invention were to be applied to Plant A, the plant performance would be significantly increased, as indicated by the results presented in Table 2.

TABLE 2

Predicted Improvement In Commercial Bioreactor Performance

| | Units | Plant A- typical operation | Plant A- using the method of the invention |
|---|---|---|---|
| Reactor temperature | ° C. | 42 | 77 |
| Microbial type strain | — | Acidithiobacillus | Sulfolobus |
| Inlet gas oxygen content | % by volume | 20.9 | 90.0 |
| Oxygen utilisation | % | 37.9 | 93.0 |
| Typical dissolved oxygen concentration | mg/l | 2.5 | 2.5 |
| Specific oxygen demand | kg/m$^3$/day | 21.6 | 59.5 |
| Specific sulphide oxidation duty | kg/m$^3$/day | 8.9 | 24.5 |
| Specific power consumption per kg sulphide oxidised | kWh/kgS$^{2-}$ | 1.7 | 1.2 |

The results dearly show the benefit of the invention in achieving higher rates of reaction by the combination of bioleaching at high temperature, adding oxygen enriched gas and by controlling the dissolved oxygen concentration to a predetermined low level (e.g. $0.2 \times 10^{-3}$ kg/m$^3$ to $4.0 \times 10^{-3}$ kg/m$^3$). The specific sulphide oxidation duty of the reactor is increased by almost threefold. Clearly the upper dissolved oxygen concentration should not be increased above a value at which microorganism growth is inhibited or stopped.

Even though additional capital for the production of oxygen is required, the savings in reactor and other costs at least offset this additional expense. Additionally, the specific power consumption per kg sulphide oxidised is decreased by approximately one-third. In a plant oxidising 300 tonnes of sulphide per day, the power saving, assuming a power cost of US$0.05 per kWh, would amount to US$2.8 million per annum. The high oxygen utilisation and increased specific sulphide oxidation capacity of the reactor represent in combination a considerable improvement over conventional bioleaching practice conducted at lower temperatures, with oxygen supplied by air.

Bioleaching Plant

FIG. 1 of the accompanying drawings illustrates a non-limiting example of the invention and shows a bioleaching plant 10 in which bioleaching is carried out, in accordance with the principles of the invention.

The plant 10 includes a bioreactor 12 with an agitator or mixer 14 which is driven by means of a motor and gearbox assembly 16.

In use a tank or vessel 18 of the reactor contains a sulphide mineral slurry 20. An impeller 22 of the agitator is immersed in the slurry and is used for mixing the slurry in a manner which is known in the art.

A probe 24 is immersed in the slurry and is used for measuring the dissolved oxygen concentration in the slurry. A second probe 26, inside the tank 18 above the surface level 28 of the slurry, is used for measuring the carbon dioxide content in the gas 30 above the slurry 20.

An oxygen source 32, a carbon dioxide source 34 and an air source 36 are connected through respective control valves 38, 40 and 42 to a sparging system 44, positioned in a lower zone inside the tank 18, immersed in the slurry 20.

The probe 24 is used to monitor the dissolved oxygen concentration in the sulphide mineral slurry 20 and provides a control signal to a control device 46. The control device controls the operation of the oxygen supply valve 38 in a manner which is known in the art but in accordance with the principles which are described herein in order to maintain a desired dissolved oxygen concentration in the slurry 20.

The probe 26 measures the carbon dioxide content in the gas above the sulphide mineral slurry 20. The probe 26 provides a control signal to a control device 48 which, in turn, controls the operation of the valve 40 in order to control the addition of carbon dioxide from the source 34 to a gas stream flowing to the sparger 44.

The air flow rate from the source 36 to the sparger 44 is controlled by means of the valve 42. Normally the valve is set to provide a more or less constant flow of air from the source 38 to the sparger and the additions of oxygen and carbon dioxide to the air stream are controlled by the valves 38 and 40 respectively. Although this is a preferred approach to adjusting the oxygen and carbon dioxide contents in the air flow to the sparger other techniques can be adopted. For example it is possible, although with a lower degree of preference, to adjust the air stream flow rate and to mix the adjustable air stream with a steady supply of oxygen and a variable supply of carbon dioxide, or vice versa. Another possibility is to have two separate air stream flows to which are added oxygen and carbon dioxide respectively. Irrespective of the technique which is adopted the objective remains the same, namely to control the additions of oxygen and carbon dioxide to the slurry 20.

Slurry 50 is fed from a slurry feed source 52 through a control valve 54 and through an inlet pipe 56 into the interior of the tank 18. The slurry feed rate may be maintained substantially constant, by appropriate adjustment of the valve 54, to ensure that slurry is supplied to the tank 18 at a rate which sustains an optimum leaching rate. The supplies of air, oxygen and carbon dioxide are then regulated, taking into account the substantially constant slurry feed rate, to achieve a desired dissolved oxygen concentration in the slurry 20 in the tank, and a desired carbon dioxide content in the gas 30 above the slurry. Although this is a preferred approach it is apparent that the slurry feed rate could be adjusted, in response to a signal from the probe 24, to achieve a desired dissolved oxygen concentration in the slurry. In other words the rate of oxygen addition to the slurry may be kept substantially constant and the slurry feed rate may be varied according to requirement.

Another variation which can be adopted is to move the probe 24 from a position at which it is immersed in the slurry to a position designated 24A at which it is located in the gas 30 above the level 28. The probe then measures the oxygen contained in the gas above the slurry i.e. the bioreactor off-gas. The oxygen content in the off-gas can also be used as a measure to control the dissolved oxygen concentration in the slurry, taking any other relevant factors into account.

Conversely it may be possible to move the carbon dioxide probe 26 (provided it is capable of measuring the dissolved carbon dioxide content) from a position at which it is directly exposed to the gas 30 to a position designated 26A at which it is immersed in the slurry in the tank. The signal produced by the probe at the position 26A is then used, via the control device 48, to control the addition of carbon dioxide from the source 34 to the air stream from the source 36.

Although the carbon dioxide source 34, which provides carbon dioxide in gas form, is readily controllable and represents a preferred way of introducing carbon into the slurry 20, it is possible to add suitable carbonate materials to the slurry 50 before feeding the slurry to the reactor. Carbonate material may also be added directly to the sulphide mineral slurry 20 in the reactor. In other cases though there may be sufficient carbonate in the sulphide mineral slurry so that it is not necessary to add carbon, in whatever form, to the slurry nor to control the carbon content in the slurry.

It is apparent from the aforegoing description which relates to the general principles of the invention that the supply of oxygen to the slurry is monitored and controlled to provide a desired dissolved oxygen concentration level in the slurry 20. This can be done in a variety of ways e.g. by controlling one or more of the following in an appropriate manner namely: the slurry feed rate, the air flow rate from the source 36, the oxygen flow rate from the source 32, and any variation of the aforegoing.

The carbon dioxide flow rate is changed in accordance with the total gas flow rate to the sparger 44 in order to maintain a concentration in the gas phase, i.e. in the gas stream to the reactor, of from 0.5% to 5% carbon dioxide by volume. This carbon dioxide range has been found to maintain an adequate dissolved carbon dioxide concentration in the slurry, a factor which is important in achieving effective leaching.

The addition of oxygen to the sulphide mineral slurry 20 is controlled in order to maintain the minimum dissolved oxygen concentration in solution at a value of from $0.2\times10^{-3}$ kg/m$^3$ to $4.0\times10^{-3}$ kg/m$^3$. The upper threshold value depends on the genus and strain of microorganism used in the bioleaching process and typically is in the range of from $4\times10^{-3}$ kg/m$^3$ to $10\times10^{-3}$ kg/m$^3$.

FIG. 1 illustrates the addition of oxygen from a source 32 of pure oxygen. The pure oxygen can be mixed with air from the source 36. Any other suitable gas can be used in place of the air. The addition of oxygen to air results to what is referred to in this specification as oxygen enriched gas i.e. a gas with an oxygen content in excess of 21% by volume. It is possible though to add oxygen substantially in pure form directly to the slurry. As used herein pure oxygen is intended to mean a gas stream which contains more than 85% oxygen by volume.

The temperature in the bioleach reactor or vessel may be controlled in any appropriate way using techniques which are known in the art. In one example the tank 18 is insulated and heating takes place by means of energy which is released by the oxidation of sulphides. The temperature of the slurry 20 is regulated using an internal cooling system 70 which includes a plurality of heat exchanger cooling coils 72 connected to an external heat exchanger 74.

The vessel 18 may be substantially sealed by means of a lid 80. Small vents 82 are provided to allow for the escape of off-gas. The off-gas may, if required, be captured or treated in any appropriate way before being released to atmosphere. Alternatively, according to requirement, the tank 18 may be open to atmosphere.

The microorganisms chosen for the leaching process will determine the leaching temperature, and vice versa. The applicant has found that a preferred operating temperature is above 60° C., for example in the range of 60° C. to 85° C. In this range thermophilic microorganisms, in any appropriate combination, are employed. In the range of from 45° C. to 60° C., on the other hand, moderate thermophiles are employed while at temperatures below 45° C. mesophiles are used. These microorganisms may, for example, be chosen from those referred to hereinbefore.

Although the benefit of adding oxygen to the slurry which is to be leached, by making use of oxygen enriched air or, more preferably, by making use of substantially pure oxygen i.e. with an oxygen content in excess of 85%, is most pronounced at high temperatures at which greater leaching rates are possible, a benefit is nonetheless to be seen when oxygen enriched air or substantially pure oxygen is added to the slurry at lower temperatures, of the order of 40° C. or even lower. At these temperatures the leaching rates are slower than at elevated temperatures and although an improvement results from using oxygen enriched air the cost thereof is generally not warranted by the relatively small increase in leaching rate.

Test Results

Figure 2:
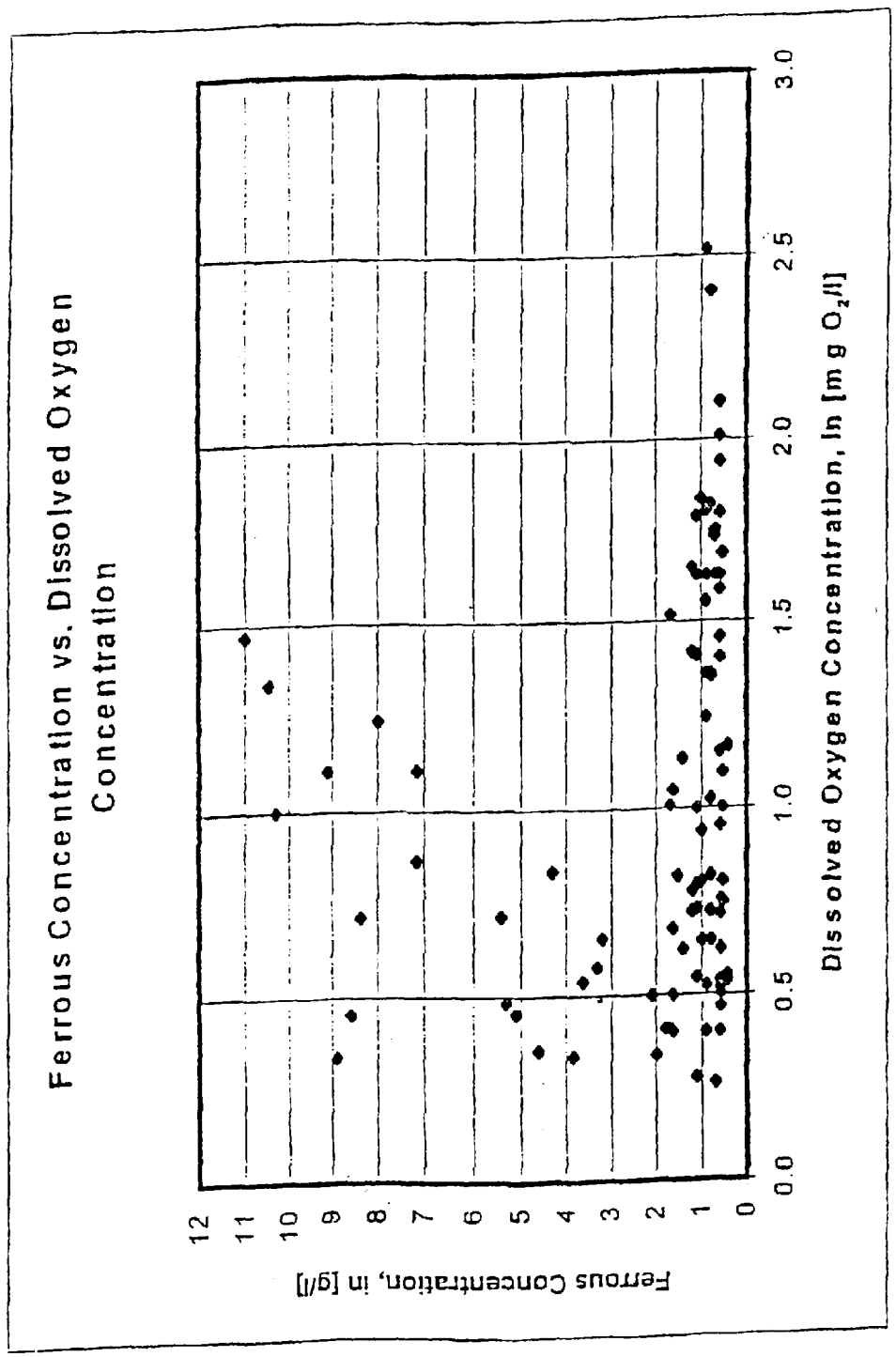

The importance of maintaining an adequate supply of oxygen and hence a sufficiently high dissolved oxygen concentration to sustain microorganism growth and mineral oxidation is shown in the results presented in FIG. 2. If the dissolved oxygen concentration is allowed to drop below 1.5 ppm, and particularly below 1.0 ppm, biooxidation becomes unstable, which is indicated by higher iron(II) concentrations in solution, of greater than 2 g/l. At consistent levels of biooxidation, achieved by maintaining a dissolved oxygen concentration above 1.5 ppm, in this experiment, iron(II) is rapidly oxidised to iron(III), and iron(II) concentrations remain generally below 1.0 g/l.

The results presented in FIG. 2 were obtained from operation of a first or primary reactor of a continuous pilot plant treating a chalcopyrite concentrate at a feed solids concentration of 10% by mass and a temperature of 77° C., with Sulfolobus-like archaea.

The effect of increasing the oxygen content of the feed gas to a bioreactor and controlling the dissolved oxygen concentration, in accordance with the principles of the invention, was tested in an experiment using a 5 m$^3$ bioreactor which was operated with a continuous pyrite or blended pyrrhotite and pyrite flotation concentrate feed, at a temperature of about 77° C., using a mixed culture of Sulfolobus-like archaea and a solids density of 10% by mass. The carbon dioxide content in the bioleach inlet gas was controlled at a level of between 1 and 1.5% by volume. The dissolved oxygen concentration was generally within the range $0.4\times10^{-3}$ kg/m$^3$ to $3.0\times10^{-3}$ kg/m$^3$. The results of the experiment are presented in FIG. 3.

Figure 3:
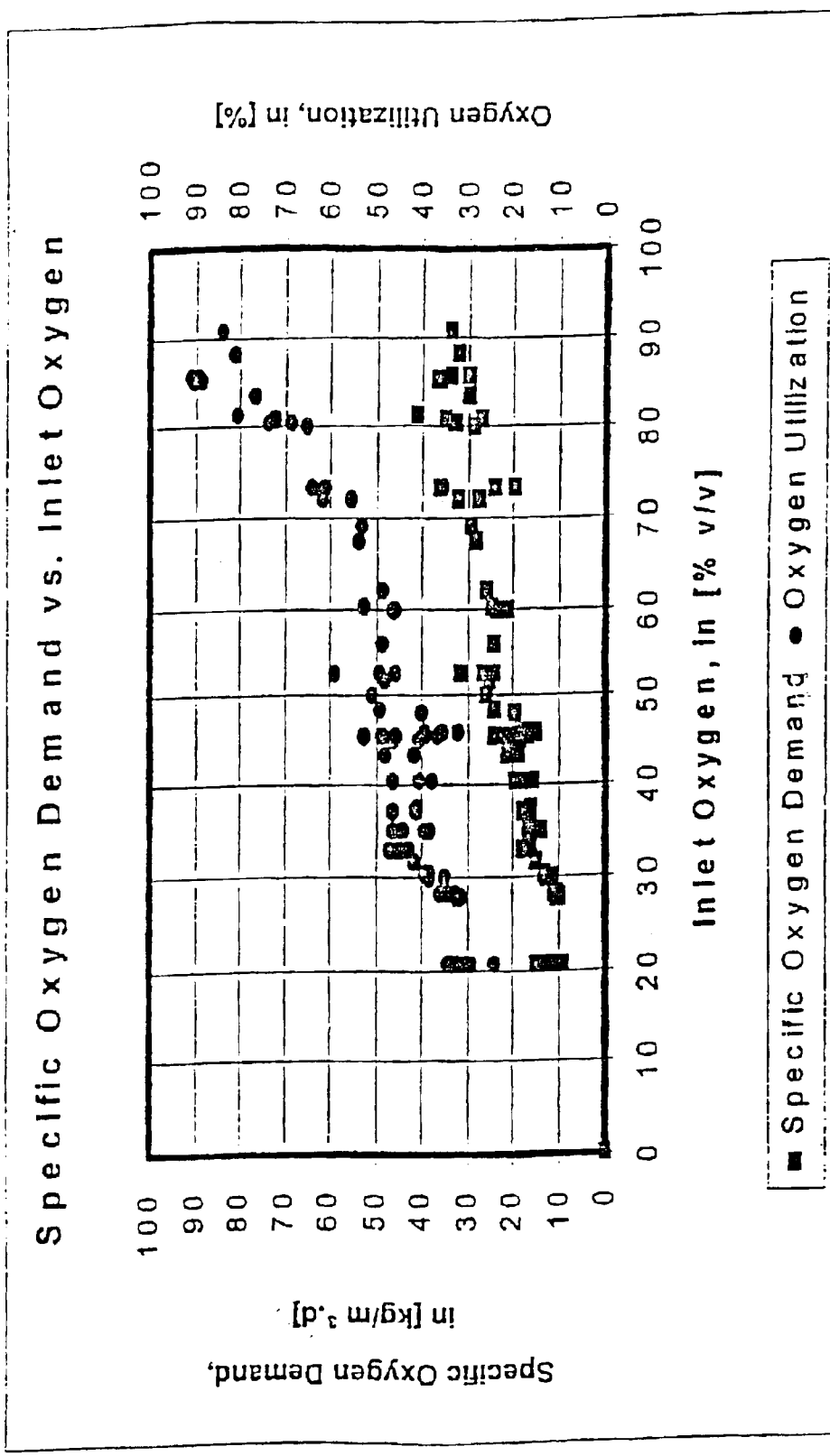

From the graphs presented in FIG. 3 it is clear that, when sparging with air (enriched with carbon dioxide: 20.7% oxygen and 1.0% carbon dioxide), the maximum oxygen demand (directly proportional to the sulphide oxidation duty) was limited to 11.3 kg/m$^3$/day, since the dissolved oxygen concentration which was achievable using air only (i.e. not enriched with oxygen) was just sufficient to maintain microorganism growth.

By controlling the oxygen content of the inlet gas, the oxygen addition rate, and the dissolved oxygen concentration in the slurry in the range of $0.4\times10^{-3}$ kg/m$^3$ to $3.0\times10^{-3}$ kg/m$^3$, the oxygen demand, i.e. the sulphide mineral oxidation rate, was increased dramatically. The dissolved oxygen concentration was controlled to a low value, but above the minimum Emit for successful microorganism growth, so that the utilisation of oxygen was maximised. The results show the oxygen demand, or sulphide oxidation duty, was increased by over threefold. Thus by increasing the oxygen content in the inlet gas from 20.7% to a maximum of 90.8% the specific oxygen demand was increased from 11.3 kg/m$^3$/day to 33.7 kg/m$^3$/day. In addition, by controlling the dissolved oxygen concentration to a low value, but above the minimum value for sustained microorganism growth, the oxygen utilisation was maximised. The oxygen utilisation showed a general increase with an increase in the oxygen content of the inlet gas from 29% (for an inlet gas oxygen content of 20.7%) to 91% (for inlet gas containing 85.5% oxygen).

The high oxygen utilisations achieved of well over 60% are much better than expected. Analysis of the results indicates that the oxygen mass transfer coefficient (M), as defined by equation (1), is significantly and unexpectedly enhanced for operation of the bioreactor at a high temperature (77° C.) and with a high oxygen content in the inlet gas (from 29% to 91% in the experiment). In fact, the oxygen mass transfer coefficient (M) is increased by a factor of 2.69, on average, compared to the applicant's design value. This enhancement is after considering the improvement in the mass transfer coefficient due to temperature, which would be expected to increase the value of M by a factor of 1.59 for a temperature increase from 42° C. to 77° C., according to the temperature correction factor. This correction factor has been demonstrated experimentally to be valid for a temperature in the range of from 15° C. to 70° C.

Figure 4:
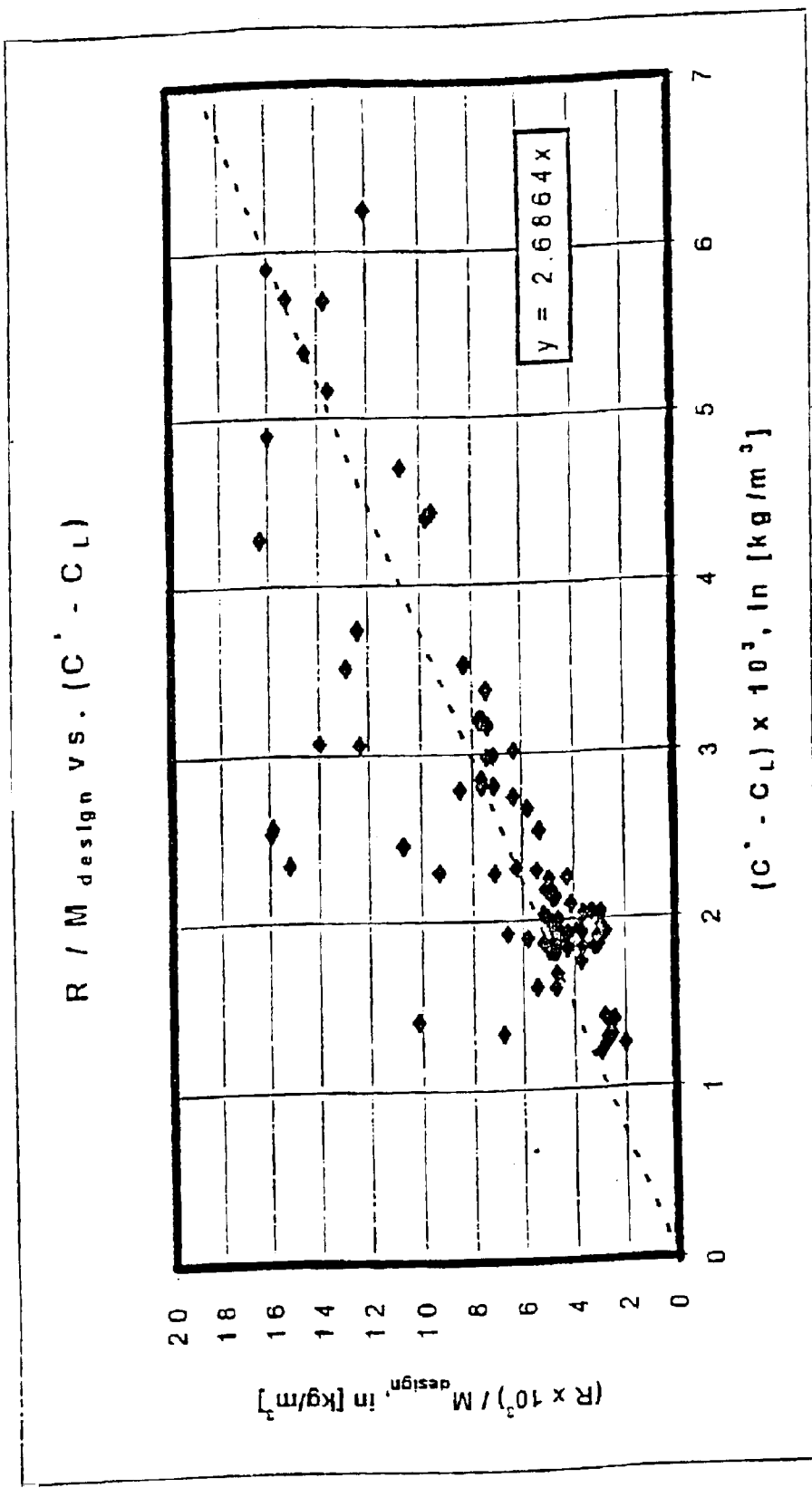

The determination of the enhanced oxygen mass transfer coefficient is shown from the results presented in FIG. 4, where the oxygen demand divided by the design oxygen mass transfer coefficient ($M_{design}$) is plotted against the oxygen driving force, as defined in equation (1). The slope of the regression line plotted through the data indicates the enhancement in the oxygen mass transfer coefficient by a factor of 2.69.

Process Example

The inventive principles in the preceding section have been described in the context of sulphide minerals in general and, as will be appreciated by those skilled in the art, these principles can be applied to nickel bearing sulphide minerals in particular.

Figure 5:
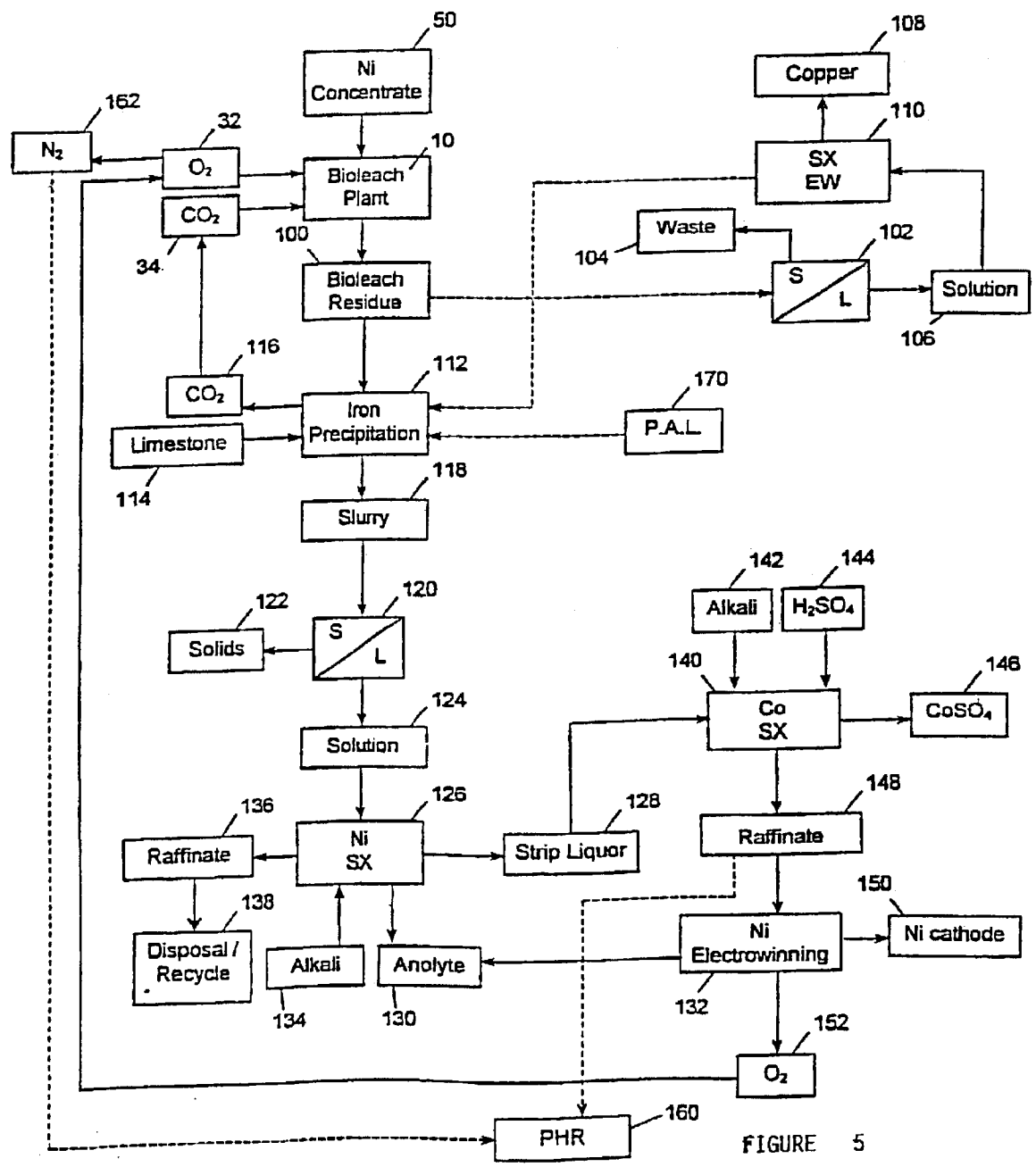
FIG. 5 is a process flow sheet illustrating the recovery of nickel according to the invention, and various possible modifications.

FIG. 5 of the accompanying drawings is a process flow chart illustrating the use of method of the invention for recovering nickel.

In FIG. 5 the plant 10 which is shown in FIG. 1 and which is described hereinbefore bears the same reference numeral. The oxygen and carbon dioxide sources bear the reference numerals 32 and 34 respectively. The nickel sulphide slurry is labelled with the numeral 50.

The slurry 50 is fed to the plant 10 which contains one or more bioleach reactors using oxygen enriched gas or pure oxygen, labelled 32, as the oxidant. The oxygen concentration in the reactor is controlled in the manner which has been described hereinbefore depending on the type of microorganism used.

The bioleaching process produces a bioleach residue slurry 100 which contains solubilised nickel, and iron predominantly in the ferric state.

Optionally at this point the bioleach residue slurry 100 may be subjected to a liquid/solid separation step 102 which produces waste 104 and solution 104 from which copper 108, a metal commonly associated with nickel, is recovered by solvent extraction and electrowinning 110. Raffinate 111 from the solvent extraction step is returned to the main process flow stream.

Referring again to the main process flow stream iron in the bioleach residue slurry is removed by precipitation 112 brought about by the addition of limestone 114. Optionally, if there is insufficient carbonate in the nickel concentrate 50, some of the carbon dioxide 116 generated in the iron precipitation may be introduced into the slurry in the plant 10 in any appropriate way for example by being blended with the oxygen 32, by being added to the carbon dioxide source 34, or by being injected directly into the slurry.

Slurry 118 produced by the iron precipitation 112 is subjected to a liquid/solid separation step 120 to produce solids 122 which are disposed of and a solution 124 which is fed to a nickel solvent extraction step 126. Strip liquor 128 from the solvent extraction step 126 is obtained by stripping the loaded solvent with anolyte 130 from a nickel electrowinning step 132. The pH of the nickel solvent extraction loading stage is maintained using a suitable alkali 134.

Raffinate 136 produced during the solvent extraction step may be disposed of or recycled (138).

The impure nickel strip liquor 128 is sent to another solvent extraction step 140 where cobalt and other impurities are removed. The pH of the cobalt solvent extraction loading stage is maintained using a suitable alkali 142. Dilute sulphuric acid 144 is used to strip the organic solvent to produce an impure cobalt sulphate solution 146 for further purification.

The cobalt solvent extraction raffinate 148 forms an advance electrolyte for the nickel electrowinning stage 132 in which nickel cathodes 150 are produced.

Oxygen gas 152 generated at the anode during the electrowinning process 128 may be recycled to the source 32, or directly into the slurry in the plant 10, to supplement the oxygen requirements during the bioleaching process.

The method of the invention is not limited to the use of an electrowinning process for the recovery of nickel. Other techniques may be employed. For example pressure hydrogen reduction (PHR) may be used as the production method of nickel. As the PHR system is known in the art it is not further described herein. its use is however indicated symbolically by means of a block 160 as an alternative to the electrowinning process 132. In the PHR process nitrogen gas is required for purging the nickel reduction autoclaves during the production cycle of nickel powder. If the oxygen source 32 is used on site then, as a by product, nitrogen gas 162 is generated. This gas may be used, as indicated, for purging the autoclaves used for nickel powder production in the PHR process.

As has been indicated it is possible to operate the bioleach plant 10 in parallel to a pressure acid leaching (PAL) system which is used for the recovery of nickel from lateritic ores. This option is illustrated by means of a block labelled 170 which represents a pressure acid leaching installation for the recovery of nickel from lateritic ores.

The volumes arising downstream of PAL processes are roughly an order of magnitude higher than the mass of nickel sulphide concentrates arising from sulphide nickel mines. Since the residue from the bioleach plant 10 is similar in nature to the residue from the PAL installation 170, i.e. each residue has a low pH, and contains solubilised nickel and iron, it is advantageous to treat the bioleach residue for nickel and cobalt recovery using the larger PAL downstream process equipment. Thus combining a nickel sulphide bioleach residue slurry (100) with a PAL residue slurry and treating the streams together thereafter brings about considerable economies of scale in terms of capital and operating costs.

Pilot Plant Test Work

Bioleach pilot plant test work was completed, using a predominantly pentlandite concentrate assaying 11.9% nickel, on a 0.849 m³ pilot plant consisting of 5 reactors configured as 1 primary reactor followed by 4 secondary reactors in series. The total primary volume was 237 l and the total secondary volume was 612 l. All test work was carried out at between 65° C. to 68° C. using a feed slurry containing 15% solids. The microorganism used was a mixed culture of Sulfolobus-like archaea. The oxygen utilisation results obtained in the primary stage during the test work, using analysis of inlet and outlet gas mixtures, are shown in Table 3.

TABLE 3

Primary Reactor Nickel Dissolution and Oxygen Uptake Results for Thermophile Pilot Test Work

| Retention Days | Ni Dissolution % | Specific $S^{2-}$ Oxidation Rate kg/m³ | Oxygen Consumption Rate kg/m³/h |
|---|---|---|---|
| 2.0 | 83.5 | 0.729 | 1.58 |

The results in Table 3 may be compared to mesophile results obtained at 40° C. to 45° C. This test work was completed using the same concentrate as before, containing 11.9% nickel. The primary reactor in this test work had a volume of 60 l, and the feed contained 15.9% solids. The results are shown in Table 4.

TABLE 4

Primary Reactor Nickel Dissolution and Oxygen Uptake Results for Mesophile Bioleaching

| Retention Days | Ni Dissolution % | Specific $S^{2-}$ Oxidation Rate kg/m³ | Oxygen Consumption Rate kg/m³/h |
|---|---|---|---|
| 2.4 | 68.3 | 0.534 | 1.16 |

These results indicate about a 40% increase in specific sulphide oxidation rate when using thermophiles according to the method of the invention.

What is claimed is:

1. The method of recovering nickel from a nickel bearing sulphide mineral slurry which includes the steps of:
   (a) subjecting the slurry in a reactor to a bioleaching process at a temperature in excess of 40° C.;
   (b) supplying a feed gas which contains in excess of 21% oxygen by volume, to the slurry;
   (c) controlling a dissolved oxygen concentration in the slurry at a level of from $0.2 \times 10^{-3}$ kg/m$^3$ to $10 \times 10^{-3}$ kg/m$^3$ by controlling at least one of the following: an oxygen content of the feed gas; a feed gas supply rate; a rate of feed of the slurry to the reactor; and
   (d) recovering nickel from a bioleach residue of the bioleaching process.

2. The method according to claim 1 further including removing copper from said bioleach residue before recovering nickel therefrom.

3. The method according to claim 2 further including removing cobalt from said bioleach residue before recovering nickel therefrom.

4. The method according to claim 1 further including removing iron from said bioleach residue before recovering nickel therefrom.

5. The method according to claim 4 further including precipitating iron from said bioleach residue by the addition of limestone to said residue.

6. The method according to claim 5 further including feeding carbon dioxide generated in the step of precipitating iron to said feed gas of step (b) or directly to said slurry.

7. The method according to claim 1 further including recovering nickel in step (d) using a solvent extraction and electrowinning process.

8. The method according to claim 7 further including feeding oxygen generated during said electrowinning process to said feed gas of step (b) or directly to said slurry.

9. The method according to claim 1 further including recovering nickel in step (d) using a pressure hydrogen reduction process and purging autoclaves used for nickel powder production in said pressure hydrogen reduction process using nitrogen, produced during generation of said feed gas supplied to said the slurry in step (b).

10. The method according to claim 1 further including adding said bioleach residue to a nickel laterite residue slurry before carrying out step (d), said nickel laterite residue slurry is produced by operating in parallel a process for recovering nickel from lateritic ores by pressure acid leaching to produce said nickel laterite residue slurry.

11. The method according to claim 1 wherein said feed gas contains in excess of 85% oxygen by volume.

12. The method according to claim 1 further including controlling a carbon content of said slurry.

13. The method according to claim 1 further including controlling a carbon dioxide content of said slurry in a range of from 0.5% to 5.0% by volume.

14. The method according to claim 1 wherein said bioleaching process is carried out at a temperature in a range of from 40° C. to 100° C.

15. The method according to claim 14 wherein said temperature is in a range of from 60° C. to 85° C.

16. The method according to claim 1 further including bioleaching said slurry at a temperature of up to 45° C. using mesophile microorganisms.

17. The method according to claim 16 wherein said microorganisms are selected from the genus groups comprising: Acidithiobacillus; Thiobacillus; Leptosprillum; Ferromicrobium; and Acidiphilium.

18. The method according to claim 17 wherein said microorganisms are selected from the group comprising *Acidithiobacillus caldus; Acidithiobacillus thiooxidans; Acidithiobacillus ferrooxidans; Acidithiobacillus acidophilus: Thiobacillus prosperus; Leptospirillum ferrooxidans; Ferromicrobium acidophilus;* and *Acidiphilium cryptum.*

19. The method according to claim 1 further including bioleaching said slurry at a temperature of from 45° C. to 60° C. using moderate thermophile microorganisms.

20. The method according to claim 19 wherein said microorganisms are selected from the genus groups comprising Acidithiobacillus; Acidimicrobium; Sulfobacillus; Ferroplasma; and Alicyclobacillus.

21. The method according to claim 20 wherein said microorganisms are selected from the group comprising *Acidithiobacillus caldus; Acidimicrobium ferrooxidans; Sulfobacillus acidophilus; Sulfobacillus disulfidooxidans; Sulfobacillus thermosulfidooxidans; Ferroplasma acidarmanus; Thermoplasma acidophilum;* and *Alicyclobacillus acidocaldrius.*

22. The method according to claim 15 further including bioleaching said slurry at a temperature of from 60° C. to 85° C. using thermophilic microorganisms.

23. The method according to claim 22 wherein said microorganisms are selected from the genus groups comprising Acidothermus; Sulfolobus; Metallosphaera; Acidianus; Ferroplasma; Thermoplasma; and Picrophilus.

24. The method according to claim 23 wherein said microorganisms are selected from the group comprising *Sulfolobus metallicus; Sulfolobus acidocaldarius; Sulfolobus thermosulfidooxidans; Acidianus infernus; Metallosphaera sedula; Ferroplasma acidarmanus; Thermoplasma acidophilum; Thermoplasma volcanium;* and *Picrophilus oshimae.*

25. A plant for recovering nickel from a nickel bearing sulphide mineral slurry which includes a reactor vessel, a source which feeds a nickel bearing sulphide mineral slurry to said vessel wherein a bioleaching process is carried out at a temperature in excess of 40° C., an oxygen source which supplies oxygen in a form of oxygen enriched air or substantially pure oxygen to said slurry, a device which measures dissolved oxygen concentration in said slurry in said vessel, a control mechanism whereby, in response to said measured dissolved oxygen concentration, a supply of oxygen from said oxygen source to said slurry is controlled to achieve a dissolved oxygen concentration in said slurry of from $0.2 \times 10^{-3}$ kg/m$^3$ to $10 \times 10^{-3}$ kg/m$^3$, and a recovery system which recovers nickel from a bioleach residue from said reactor vessel.

26. The plant according to claim 25 further including an installation for recovering nickel from lateritic ores by pressure acid leaching to produce a nickel laterite residue slurry which is combined with said bioleach residue from said reactor vessel, and the combined nickel laterite residue slurry and bioleach residue are fed to said recovery system.

* * * * *